June 1, 1965
R. ANTHONY
3,186,850
CUP CONTAINING BEVERAGE INGREDIENT
Filed April 28, 1960
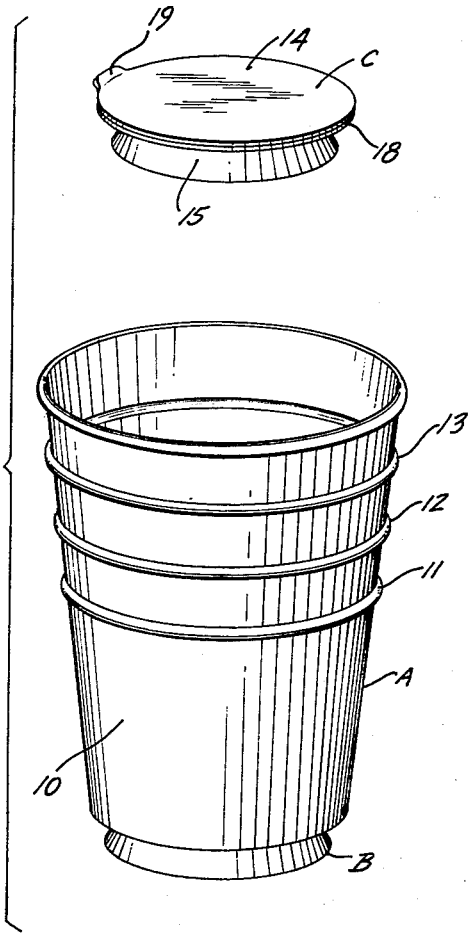
FIG.1
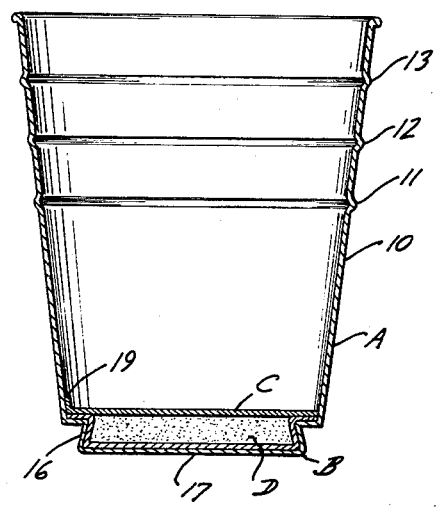
FIG.2
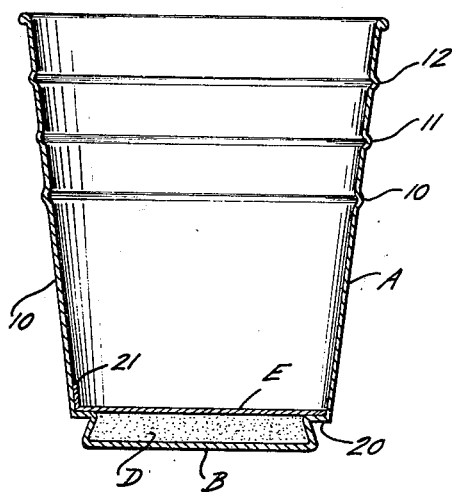
FIG.3
INVENTOR.
ROY ANTHONY
BY 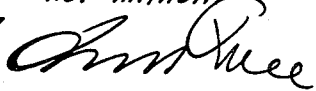
ATTORNEY

3,186,850
CUP CONTAINING BEVERAGE INGREDIENT
Roy Anthony, 200 E. 63rd St., New York 23, N.Y.
Filed Apr. 28, 1960, Ser. No. 25,267
1 Claim. (Cl. 99—78)

The present invention relates to a cup arrangement, and it particularly relates to a combination cup for various types of drinks.

Although not specifically limited thereto, the present invention will be directed to a cup for flavored drinks and particularly for holding drinks, such as coffee, cocoa, soup, carbonated beverages or even hot or cold water drinks to which flavoring substitutes or other ingredients are to be added.

It is among the objects of the present invention to provide a cup arrangement which will have included therein and in convenient receptacle, a desired flavoring material for a hot or cold drink as the case may be, readily available in forming part of the single cup unit.

Another object is to provide a dispensing cup arrangement in which the cup may have a satisfactory seal for flavoring or sweetening arrangements which are readily available when the cup is to receive hot or cold liquid, and serve to furnish a finished drink.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to make the cup or container arrangement of dispensible plastic or paper, and the plastic may be flexible or stiff and may consist of various compositions and body retaining combinations of polyethylene, polyvinyl, or polystyrene resins.

In the preferred embodiment, there is a covered recess provided in the bottom of the container or cup which may in itself serve as a container for the flavoring and sweetening material, or which may form a receptacle to receive a package readily available for dispensing the flavoring or sweetening materials.

The present invention also contemplates the provision of measuring ridges or grooves on the sides of the cup to enable an indication to the user or consumer of the amount of fluid to be added to form a strong, medium or mild beverage or drink in connection with the amount of flavoring available.

In the preferred form of the invention, the container itself consists of a frustro conical receptacle divergent upwardly and having a reduced diameter recessed portion at the lower part thereof forming in itself a receptacle for the flavoring material, or forming a receptacle for a similarly shaped package for the flavoring materials.

Since the flavoring materials are usually subject to deterioration upon exposure to normal atmosphere, they should be sealed against the entry of the oxygen and moisture of the air.

The sealing envelope may be provided with a tab to be readily removed when the flavoring and sweeting materials are to be dissolved in the beverage, or the entire container may be made of the snap-in type so that it may snap-out with its contents dumped into the cup or container immediately before usage.

The present invention is most conveniently employed for coffee, cocoa, tea, soups, and in general, cold or hot water beverages and even carbonated beverages.

The flavoring materials may be powdered coffee or combinations of powdered coffee with cream or sugar.

It is also possible to use powdered soluble cocoa or tea with or without powdered milk, sugar and other flavorings.

With tea, there may be powered tea essence together with sugar, cream or lemon.

With carbonated drinks, it may be possible to provide a carbonate with the releasing agent together with the flavoring.

With soups, such as beef or chicken bouillon, the powdered essence and flavoring may be included.

In general, to obtain the finished drink, it is only necessary to add hot or cold water with the flavoring materials being in the package or receptacle forming part of the container.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

FIG. 1 is a top plan view showing the internal receptacle removed from the container.

FIG. 2 is a transverse vertical side sectional view of the device of FIG. 1 showing the receptacle in position in the container.

FIG. 3 is a side sectional view showing the bottom of the container in itself serving as a receptacle.

Referring to FIGS. 1 and 2, there is shown a container A having a reduced diameter, lowered recessed snap-in portion B with a snap-in container C.

The container A may have the frustro conical sides 10, and it may be ridged at 11, 12 and 13 to indicate the amount of water that should be added to give a strong, medium or weak drink.

These ridges 11, 12 and 13 are also used for insulating purposes so that they may be more readily gripped by the user when a hot beverage is included.

The wall 10 may be made of a stiff or pliable polyethylene, polyvinyl or polystyrene resin which will not release any flavoring or taste into the hot or cold beverage.

It may also be a treated paper which will be waterproof and grease proof.

The snap-in container C has a cover 14 and a frustro conical base portion 15 which may be snapped into the conical side wall 16 of the reduced diameter portion B.

The base of the container C will contact the base of the reduced diameter portion B as shown in FIG. 2.

The cover 14 may be sealed to a flange at the top of the container C as indicated at 18 so that the cover 14 will not separate from the base 15 when it is inserted or pulled out by the tab 19 from the bottom of the receptacle as indicated in FIG. 2.

However, when the cup is ready for usage, the tab should be so fixed that upon holding the lower base portion 15 of the receptacle C, the receptacle may be ripped open, and the contents indicated at D dumped in the cup before, during or after the cup is filled to the positions 11, 12 and 13 by hot or cold liquid, water or carbonated materials.

The powdered material may be powdered coffee; powdered coffee, and a milk or cream substance; powdered coffee and powdered sugar; powdered cocoa with sugar; powdered tea, or powdered tea, lemon and sugar combinations; powdered milk; powdered beef, or powdered chicken bouillon and powdered flavors which may or may not contain carbonating agents.

In the alternative form of the invention of FIG. 3, the entire reduced diameter base portion B of the cup A is filled with a finely divided material, such as D, and is covered by the lid E which rests upon the side flanges 20 and is sealed thereto so as to avoid entry of air and moisture.

The tab 21 will permit this cover E to be readily removed.

The seal at both 20 as well as at 18 may be accomplished by heat and pressure with a moisture and air resistant adhesive which may, nevertheless be readily broken by a sharp pull on the tab 19 in FIG. 1 or 21 in FIG. 3.

It is thus apparent that the applicant has provided a novel flavoring cup which may be generally used in the dispensation of beverages in connection with vending machines or in stations, places of public assembly, where by use of available hot or cold water, a complete beverage is immediately available and dispensable.

As many changes could be made in the above beverage cup construction, and many widely different embodiments of this invention could be made without departing from the scope of the claim, it is intended that all matter contained in the above description shall be interpreted as illustrative and not in a limiting sense.

Plastic as well as laminated or plastic impregnated board may be applied throughout the construction.

The cover disk used internally of the cup may also be provided with suitable tangs or even recesses to permit them to be lifted out of position or snapped in position.

Having now particularly described and ascertained the nature of the invention, and in what mannner the same is to be performed, what is claimed is:

A prepared mixed beverage cup having an upper container portion to receive the mixed beverage and a lower container portion to receive the dry ingredients, said upper container portion consisting of an elongated cylindrical shaped drinking cup having a plurality of spaced peripheral marking circles thereon to indicate the amount of liquid to be added, and said lower container portion being relatively short and flat and of smaller diameter than the upper container portion having a shoulder at the junction of the lower end of the upper container portion and at the upper end of the lower container portion, said container portion receiving a dry mixture of beverage ingredients and a closure resting on said shoulder and sealing the lower container from the air and moisture and from the upper container, both said upper and lower container portions being of conical shape and convergent toward each other and at their point of meeting at their different diameters to form said shoulder, said closure consisting of a tapped disk having associated therewith a depending snap-in container having the same outside dimensions as the interior of the lower container.

References Cited by the Examiner
UNITED STATES PATENTS

| | | |
|---|---|---|
| 1,172,483 | 2/16 | Rike et al. |
| 1,709,168 | 4/29 | Epperson. |
| 1,770,118 | 7/30 | Williams. |
| 2,529,837 | 11/50 | Denison. |

A. LOUIS MONACELL, *Primary Examiner.*

EARLE J. DRUMMOND, ABRAHAM H. WINKELSTEIN, *Examiners.*